(12) United States Patent
Anglin et al.

(10) Patent No.: US 10,666,442 B2
(45) Date of Patent: *May 26, 2020

(54) PASSWORD MANAGEMENT AND VERIFICATION WITH A BLOCKCHAIN

(71) Applicant: International Business Machines Corporation, Armonk, NY (US)

(72) Inventors: Debbie Anglin, Williamson, TX (US); Howard Anglin, Leander, TX (US); Su Liu, Austin, TX (US); Yu Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/826,248

(22) Filed: Nov. 29, 2017

(65) Prior Publication Data

US 2019/0036698 A1    Jan. 31, 2019

Related U.S. Application Data

(63) Continuation of application No. 15/661,018, filed on Jul. 27, 2017.

(51) Int. Cl.
*H04L 9/32* (2006.01)
*G06F 9/54* (2006.01)

(52) U.S. Cl.
CPC ............ *H04L 9/3226* (2013.01); *G06F 9/54* (2013.01); *H04L 9/3236* (2013.01); *H04L 9/3242* (2013.01); *H04L 2209/38* (2013.01)

(58) Field of Classification Search
CPC ... H04L 9/0643; H04L 9/3226; H04L 9/3228; H04L 9/3231; H04L 9/3236; H04L 9/3239; H04L 9/3242; H04L 9/05; H04L 63/08; H04L 63/083; H04L 63/0846; H04L 63/10; H04L 2209/38; G06F 21/30; G06F 21/31; G06F 21/78

See application file for complete search history.

(56) References Cited

U.S. PATENT DOCUMENTS 9,384,342 B2   7/2016   Kominar et al.
10,123,202 B1  11/2018  Polehn et al.
(Continued)

FOREIGN PATENT DOCUMENTS

WO    2009101549 A2    8/2009

OTHER PUBLICATIONS

Xie et al. SIM: A smartphone-based identity management framework and its application to Arkansas trauma image repository. Bioinformatics and Biomedicine (BIBM), 2013 IEEE International Conference on. IEEE, 2013. (Background), p. 5.
(Continued)

*Primary Examiner* — Shanto Abedin
*Assistant Examiner* — Adrian Stoica (57) ABSTRACT

An example operation may include one or more of hashing a password received from a user device to create one or more password hash values, determining whether the one or more password hash values match any internal password hash values of an internal password history chain stored in a blockchain, and providing an access level to the user device assigned to the matched one or more internal password hash values.

20 Claims, 9 Drawing Sheets

(56) References Cited

U.S. PATENT DOCUMENTS

| | | | |
|---|---|---|---|
| 2015/0127940 A1* | 5/2015 | Polehn | H04L 63/0435 |
| | | | 713/168 |
| 2016/0261411 A1 | 9/2016 | Yau et al. | |
| 2016/0285633 A1 | 9/2016 | Allinson et al. | |
| 2017/0046709 A1 | 2/2017 | Lee et al. | |
| 2017/0243213 A1* | 8/2017 | Castinado | G06Q 20/401 |
| 2017/0330180 A1* | 11/2017 | Song | G06F 21/33 |
| 2017/0353311 A1* | 12/2017 | Schukai | H04L 9/3234 |
| 2018/0063189 A1* | 3/2018 | Versteeg | H04L 63/1466 |
| 2018/0082256 A1* | 3/2018 | Tummuru | G06Q 10/1053 |
| 2018/0248845 A1* | 8/2018 | Irwan | H04L 9/3239 |
| 2019/0026450 A1* | 1/2019 | Egner | H04W 4/029 |

OTHER PUBLICATIONS

Linton et al. Dynamic Topic Modelling for Cryptocurrency Community Forums. SFB 649 Discussion Paper 2016-051 (2016), p. 11.
LastPass, LastPass Now Warns You W h e n You're Using a Weak or Duplicate Password, available at http://blog.lastpass.com/2013/03/lastpass-now-warns-you-when-youre-using.html (Related).

* cited by examiner

PASSWORD MANAGEMENT AND VERIFICATION WITH A BLOCKCHAIN

TECHNICAL FIELD

This application generally relates to the management of passwords, and more particularly, to password management and verification with a blockchain.

BACKGROUND

A Blockchain is a type of computing architecture that enables a peer-to-peer distributed (shared and replicated) database or ledger, not controlled by a single organization or entity, but many different ones. Spanning across a network of independent machines, the configuration permits the nodes to reliably track and maintain the state of information in a system. In doing so, a blockchain enables the cost-efficient creation of business networks without requiring a central point of control. This configuration operates in contrast to traditional database-oriented systems, where independent parties maintain their own systems of record and reconcile updates with one another in inefficient and sometimes complex inter-organizational processes, which requires the services of an independent, trusted third-party administrator.

Password management in cross-domain environments can make shared passwords susceptible to theft and fraud. When verifying passwords to be the same across domains and/or vendors without revealing the actual password, one could rely on a password management tool, however, few corporate entities would permit this type of intrusive action of installing a third party tool to manage such sensitive information.

SUMMARY

One example method of operation may include one or more of determining whether one or more password strings are related to a password, wherein the password strings are transmitted from a user device, hashing the one or more password strings to create one or more password hash values, determining whether the one or more password hash values match any internal password hash values of an internal password history chain stored in an internal blockchain, determining whether the one or more password hash values match any external password hash values of an external password history chain stored in an external blockchain, and responsive to determining the one or more password hash values do not match any internal password hash value and any external password hash values, storing a new password in one or more of the internal blockchain and the external blockchain.

Another example embodiment may include an apparatus having a processor configured to perform one or more of determine whether one or more password strings are related to a password, the password strings are transmitted from a user device, hash the one or more password strings to create one or more password hash values, determine whether the one or more password hash values match any internal password hash values of an internal password history chain stored in an internal blockchain, determine whether the one or more password hash values match any external password hash values of an external password history chain stored in an external blockchain, and responsive to determining the one or more password hash values do not match any internal password hash value and any external password hash values, store a new password in one or more of the internal blockchain and the external blockchain.

Another example embodiment may include a non-transitory computer readable storage medium configured to store instructions that when executed cause a processor to perform one or more of determining whether one or more password strings are related to a password, wherein the password strings are transmitted from a user device, hashing the one or more password strings to create one or more password hash values, determining whether the one or more password hash values match any internal password hash values of an internal password history chain stored in an internal blockchain, determining whether the one or more password hash values match any external password hash values of an external password history chain stored in an external blockchain, and responsive to determining the one or more password hash values do not match any internal password hash value and any external password hash values, storing a new password in one or more of the internal blockchain and the external blockchain.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to the management of passwords and in another embodiment relates to managing password validity, creation and other related operations via a blockchain.

Example embodiments provide a device, system, method and/or procedures for verifying whether password usage is authorized. In one example, an internal password is identified as being used in one or more external accounts. This examples includes maintaining at least two password history chains including an internal password blockchain and an external password blockchain. A password monitoring engine may be operating in an authentication server or other computing device responsible for identifying incoming password attempts. For example, input passwords, changes to passwords, etc. This example may also include monitoring any authentication-password input events by identifying any possible outbound "password strings", and hashing each outbound "password string" and obtaining a password hash value. This may be performed by using a same hash function which was used previously to hash the internal password. The account name or user profile associated with the password input may be identified and retrieved to access a password history chain in the blockchains.

Additionally, the process may include determining whether the external password hash value matches any internal password via internal password hash values of the internal password history chain. This example may also include identifying, tracking, and validating all managed passwords on all accounts, and creating and sending a warning to the user device based on a predefined credential management policy.

Figure 1A:
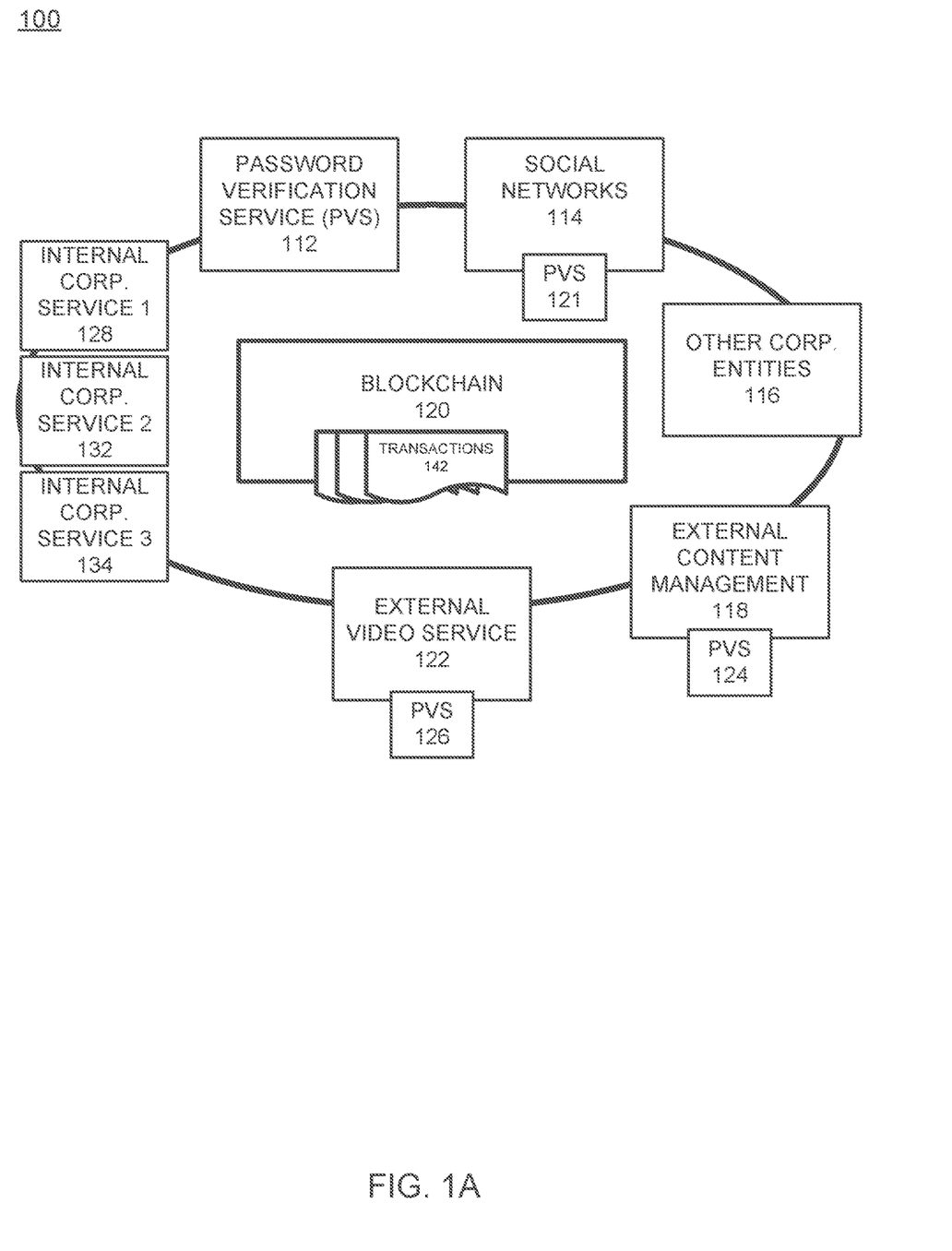
FIG. 1A illustrates a logic network diagram of a group of entities utilizing password verification services via the blockchain, according to example embodiments.

FIG. 1A illustrates a logic network diagram of a group of entities utilizing password verification services via the blockchain, according to example embodiments. Referring to FIG. 1A, the configuration 100 provides a blockchain 120 which may store a chain of transactions 142 associated with the various participants, which in this example may include a password verification service 112, social networks 114, other corporate entities 116, external content management 118, external video service(s) 122 and internal corporate services 128-134. Certain participants may have a password verification service (PVS) 121, 124 and/or 126, which utilizes the same password monitoring, tracking, and other password activities in a cross-platform manner. The participants in this example can view on the macro-level as corporate entities, and on the micro-level users within a corporation. The PVS module's credential manager for a participant would handle membership services and authorization for users. Cross-domain verification services may correlate IDs across entities and associate them with the identity of the participant (user(s)). Digital signatures can be used where a password verification request can to tagged with a signature in lieu of using IDs. For example, an identity or profile may have many user IDs associated with it across multiple domains. A profile is determined and all passwords across domains associated with this profile or user is tested for sameness during a password update process.

Example embodiments provide a method, device and/or service certified by corporation entities for verifying if any internal password is used in external accounts. Every time, when a corporate user uses, inputs. creates a password on a particular service account, a cross-domain password verification service daemon can identify, track, validate all such managed passwords on all the accounts, and if necessary, warn the user accounts and devices based on a corporate credential management policy. This may include at least two password history chains, such as an internal password blockchain and an external password blockchain, which are maintained by a cross-domain password verification service daemon (121, 124, 126). Also, a password information validator and password hash value generator can work together to determine if a validation API validation (account, password) can return positive values. A block service agent can create and encrypt a new password block with the previous password block head, account name, and current password hash value, and then connect it either to an internal password chain and/or an external password chain, accordingly. The password block can be synchronized to multiple devices as needed.

The cross-domain password verification service daemon can be installed in all the user devices and it can monitor any authentication-password input events, identify any possible outbound "password strings", hash each outbound "password string" and obtain a password hash value, which may be performed by using a same hash function which the internal password had used previously. The process may also include tracking the obtained account name and access a password history chain of that account and determine if the external password hash value matches any internal password hash values in the internal password history chain. If the answer is "YES", then prevent/warn user else back to the first operation of monitoring for passwords input strings.

In one example, each time a corporate account user submits input data, creates a password on a service account, etc., then the cross-domain password verification service daemon can identify, track, and validate all managed passwords on all accounts, and then warn the user based on corporate credential management policies. One example of such policies is to not use a corporate password (e.g., internal password) in any external account. Other policies may support other corporate mandates or rules. At least two password history chains, including an internal password blockchain and an external password blockchain are maintained by the service daemon. The password information validator and password hash value generator can work together to determine if a validation API validation (account, password) can return a positive value. A block service agent can create and encrypt a new password block with the previous password block head, account name, and current password hash value, and then connect it either to the internal password blockchain and/or the external password chain accordingly.

The password block contains can be synchronized to multiple devices as needed. The purpose of more than one blockchain, such as the internal and external blockchains is that the internal blockchain can be thought of as including one or more corporate entities or participants in order to address corporate credential management policies. The unique blockchains would be unique to a corporate entity or related corporate entities. There are instances where the reuse of passwords, such as outside of a single sign on (SSO) capability across multiple services within or related to the same corporate entity is prohibited. The internal blockchain would be similar to the architecture of the external blockchain. The external blockchain is a combination of a wider community of corporations or similar entities which are willing to participate in the service offering. This provides the ability to cross-check password reuse outside of a corporate environment. The internal blockchains then could remain private and if a large network of organizations would like to provide cross-platform password services then the password verification service (PVS) would bridge the gap between internal and external blockchains similar to the Internet and a corporate intranet.

Figure 1B:
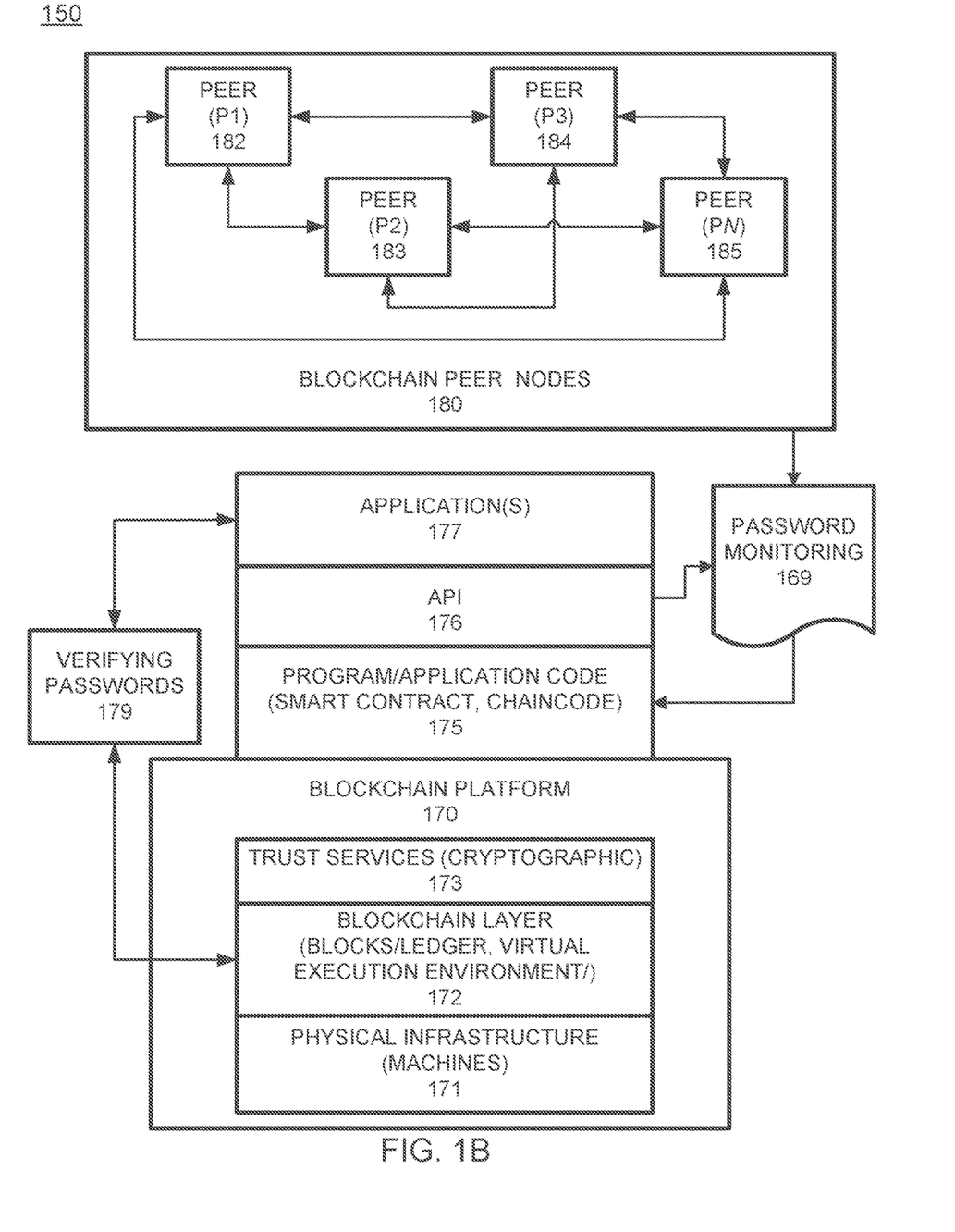
FIG. 1B illustrates a blockchain system configuration according to example embodiments.

FIG. 1B illustrates a blockchain system configuration according to example embodiments. The blockchain system 150 may include certain common blockchain elements, such as a group of assigned blockchain peer nodes 182-185 which participate in the blockchain transaction addition and validation process (consensus). Any of the blockchain peer nodes 180 may initiate new transactions and seek to write to the blockchain immutable ledger of blockchain layer 172, a copy of which is stored on the underpinning physical infrastructure 171. In this configuration, the customized blockchain configuration may include one or applications 177 which are linked to APIs 176 to access and execute stored program/application code (e.g., chain code and/or smart contracts) 175, which are created according to the customized configuration sought by the participants and can maintain their own state, control its own assets, and receive external information. This code can be deployed as a transaction and installed, via appending to the distributed ledger, on all blockchain peer nodes.

The blockchain platform 170 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 172 exposes an interface that provides access to the virtual execution environment necessary to process the program code and engage the physical platform of infrastructure 171. Cryptographic trust services 173 are used to verify transactions and keep information private. As a result, smart contract changes which are proposed and/or approved (i.e., via consensus among peers) can be created and updated on the blockchain to accurately update password information.

The blockchain configuration of FIG. 1B may process and execute program/application code 175 by way of the interfaces exposed, and the services provided, by blockchain platform 170. The code may control blockchain assets, for example, it can store and transfer data, and may be executed by the blockchain in the form of a smart contract, which includes chain code with conditions or other code elements subject to its execution. The smart contracts 175 may be created to execute reminders, updates, and/or other notifications subject to the changes, updates, etc.

This configuration may include password monitoring 169 as a process managed by an API 176 and other modules, such as a program or smart contract 175. The input of the various blockchain members may be monitored to a corporate policy managed by the peer nodes 180. In operation, the passwords are verified 179 for compliance whether input as existing passwords or as attempts to create a new password. The blockchain layer 172 may include the internal and/or external blockchain ledgers which can be used for verification and compliance with historical passwords. Any violations or potential fraud instances may cause alerts to be sent to the registered parties.

Figure 2:
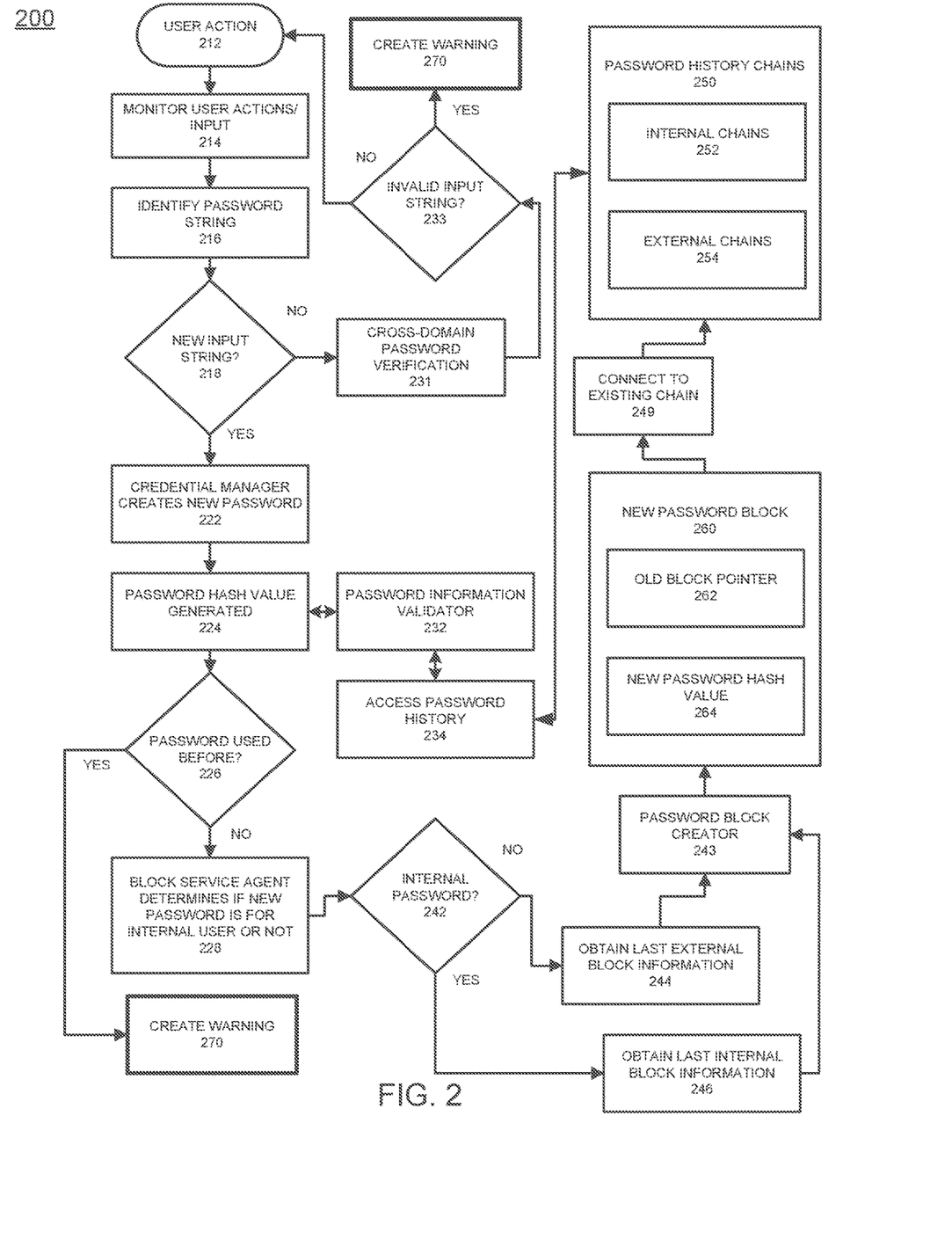
FIG. 2 illustrates a logic flow diagram of password monitoring and management functions performed via the blockchain, according to example embodiments.

FIG. 2 illustrates a logic flow diagram of password monitoring and management functions performed via the blockchain, according to example embodiments. Referring to FIG. 2, the example 200 begins with a user action 212, the action may be a textual input which is recognized by the monitoring agent as a potential password input or password modification action. In operation, a user 'A' may want to change one or more passwords at a particular time. The password monitor agent is monitoring the user A's input 214, in an attempt to identify a passcode string 216, such as a login credential. If the input string is not a new password/passcode 218 but is a current password, then normal password verification is performed 231 and the input string is identified as being invalid or not 233. If so, a warning 270 may be created to inform registered parties of the attempted login and invalid password input attempt. If not, the process completes and returns to monitoring for new user input. However, if in operation 218 the input string is a new password, then a new block creation process is triggered 222. The credential manager will assist with password creation verification and rules based on existing policies. A hash value for the new password is also created 224. The password information validator 232 uses the hash value to check if it has been used in both external 254 and internal 252 blockchains 250 by accessing the history information 234 associated with the user profile. In the event that the password was used before 226 then a normal password management process may be performed, such as prompting the user to input a new password if not new 270. Otherwise, the block service agent can check if the new passcode is generated for internal password use or not 228, and treat them separately if internal 242, then the last internal block information may be obtained 246. If external, or not internal, the last external block information 244 may be obtained and a password block may be created 243. The new password block 260 (either internal or external) may have a pointer to the old blocks 262 and a new password hash value 264. The information may be obtained by connecting 249 to the existing history chains.

Figure 3:
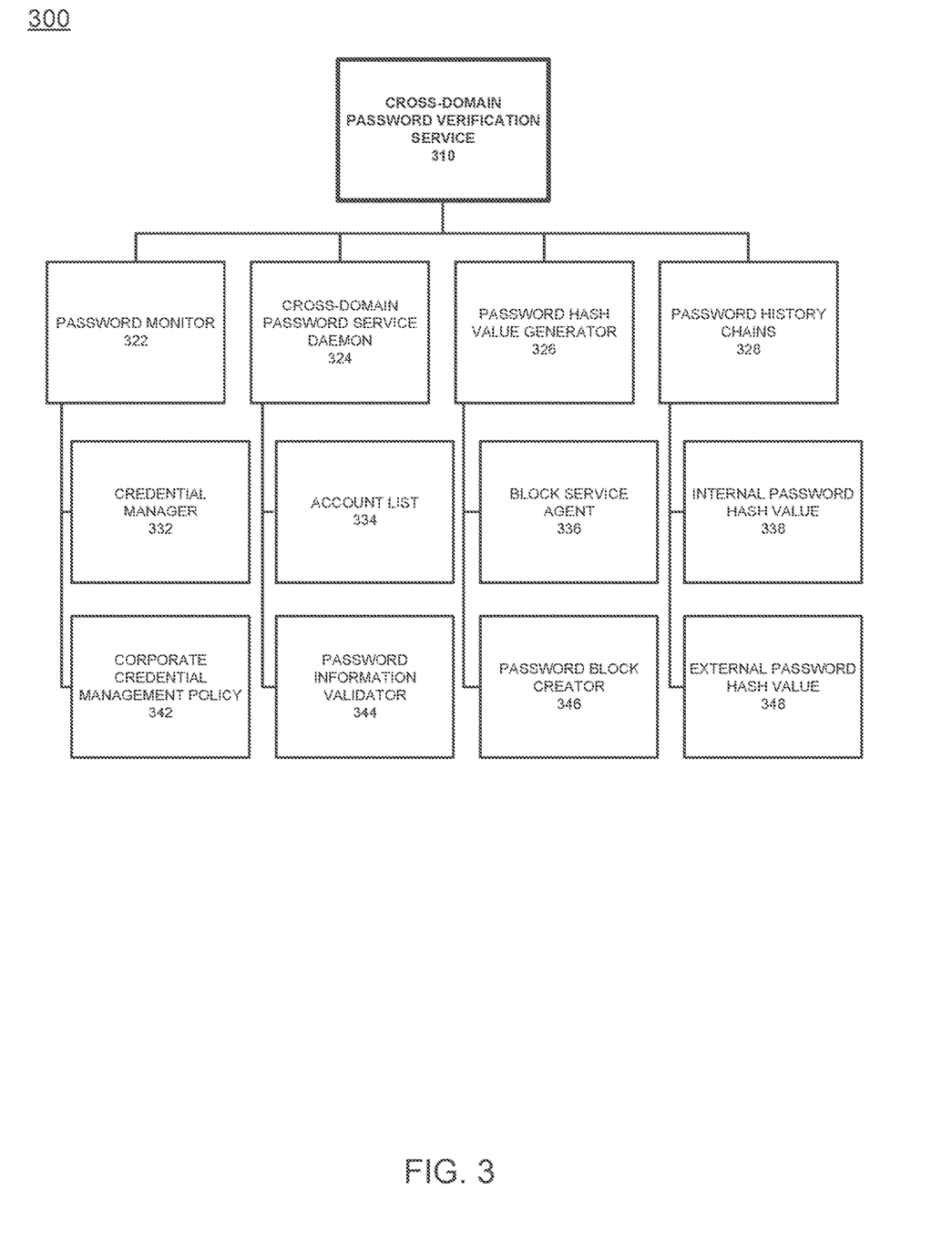
FIG. 3 illustrates a password management function configuration, according to example embodiments.

FIG. 3 illustrates a password service hierarchy configuration 300. The password monitor 322 includes a credential manager 332 with a corporate credential management policy 342, a cross-domain password verification service daemon 324, includes an account list (intranet/notes/etc.) 334 and a password information validator 344. The password hash value generator 326 includes a block service agent 336 and a password block creator unit 346. The password history chains 328 include an internal password hash value 338 and an external password hash value 348. Application programming interfaces (APIs) may be used to access different services provided by the PVS applications.

In one example, it may be time to change one's password, such as corporate or otherwise secure environment. In general, a password update service may be used to inform us that a password was previously used. Similarly, when a new/update password change request is performed, a call is made via the PVS to check the blockchain (external) to verify that the same password has not been used externally. This check is possible only for those entities which are also registered for the same service. The more participants involved the more robust the service will be for identifying whether a particular password has also been used for another service. The passwords are hashed to hide plain text password strings while permitting processing to be performed on the hashed password. In this case, a check for similarities may be performed. If the same hashing function hashes the text "passw0rd", the same output hash will be produced. So a password, in this case "passw0rd" can be checked for sameness via the cross-domain password verification service (PVS) 310 without revealing the actual "passw0rd" string.

Figure 4:
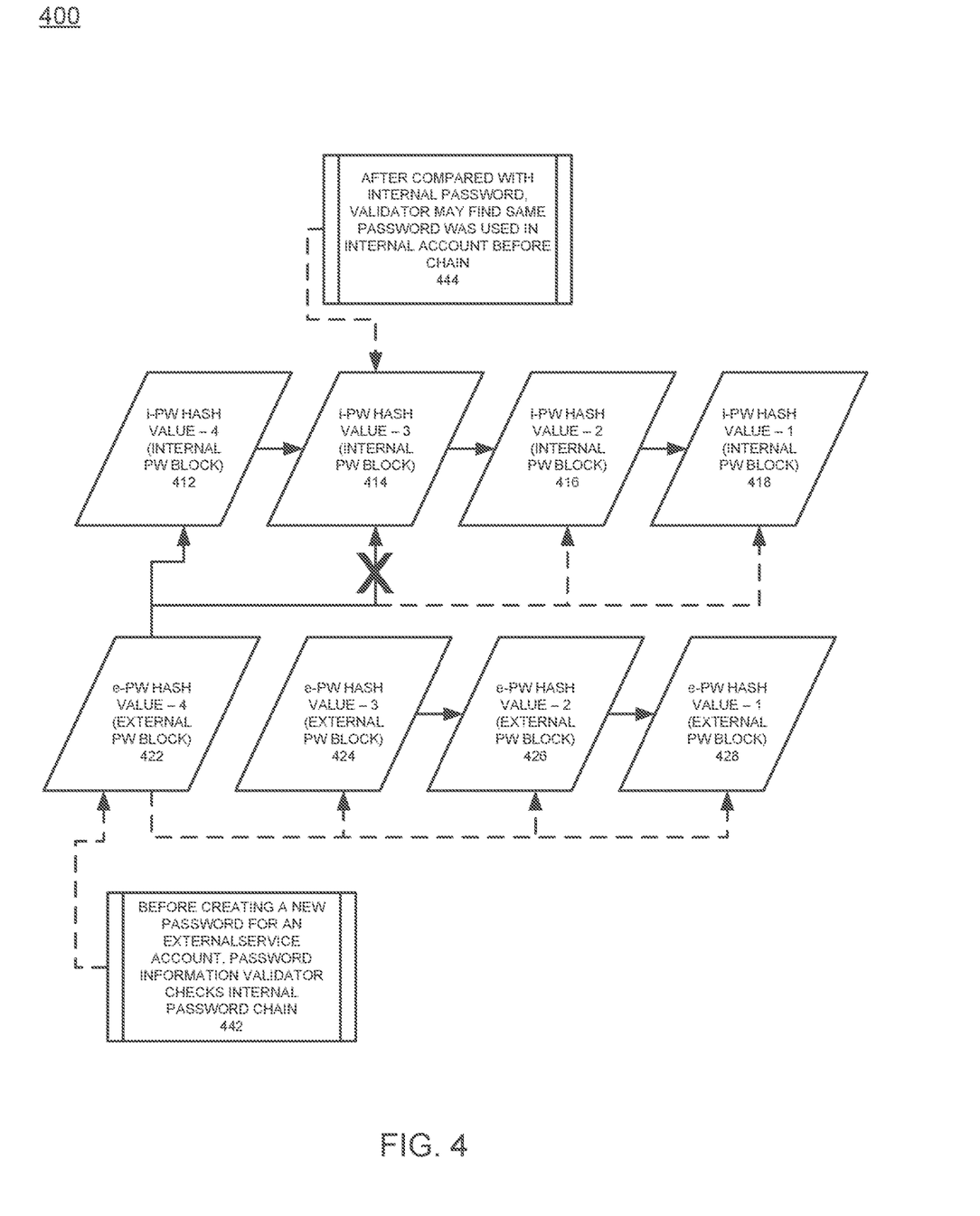
FIG. 4 illustrates a password management blockchain verification scenario, according to example embodiments.

FIG. 4 illustrates a password management blockchain verification scenario, according to example embodiments. Referring to FIG. 4, block data configuration 400 provides that before creating a new password for an external service account, the password information validator checks internal password chain 442. The internal passwords are identified from blocks 412-418 and since the validator identified that one of the internal passwords was used in an internal account before 444, the password may not be used again. The external blocks 422-428 may be compared to the internal blocks for similarities. FIG. 4 further illustrates the operation of the password information validator. For instance, if a user is trying to create a new password "123456" for an external account, then the password information validator 232 uses the hash value of hash "123456" to check if it has been used in the internal blockchain from the latest block to the oldest block (412-418). In the event that the password information validator 232 found the new password has been used in 414, then the password information validator will create a warning message and prompt the user to create a new password.

According to other examples, the hashing protects unauthorized access to an actual password or a derivative of a password while it is "stored" on the blockchain. Password hashes will be stored in the latest block on the shared/external blockchain. The latest block will represent the password of all the currently registered entities as well as all the passwords belonging to a particular user from a particular entity/participant. Password entries for previously registered participants will still be stored in the latest block on the blockchain. For previous participants, updates will only be made to the internal blockchain and may be synced with the external blockchain once they decide to participate again. When a password entered in a password form field, ideally during a password update/change process, in addition to the internal authentication mechanism or service, a service call would be made to the password monitor of a PVS, and eventually to the cross-domain password verification service to check the external or internal blockchain for a commonality. If a warning is the result of the test then an alternate password entry is required. If the password entry is not made during a password update/change process a recommendation/warning would be issued to change the password as it is being used elsewhere. Generally, a user would see the warning during the update process. Only blockchain members can modify the ledger, such as blockchain members and participants, which can modify the blockchain by updating, appending and/or removing entries.

Figure 5:
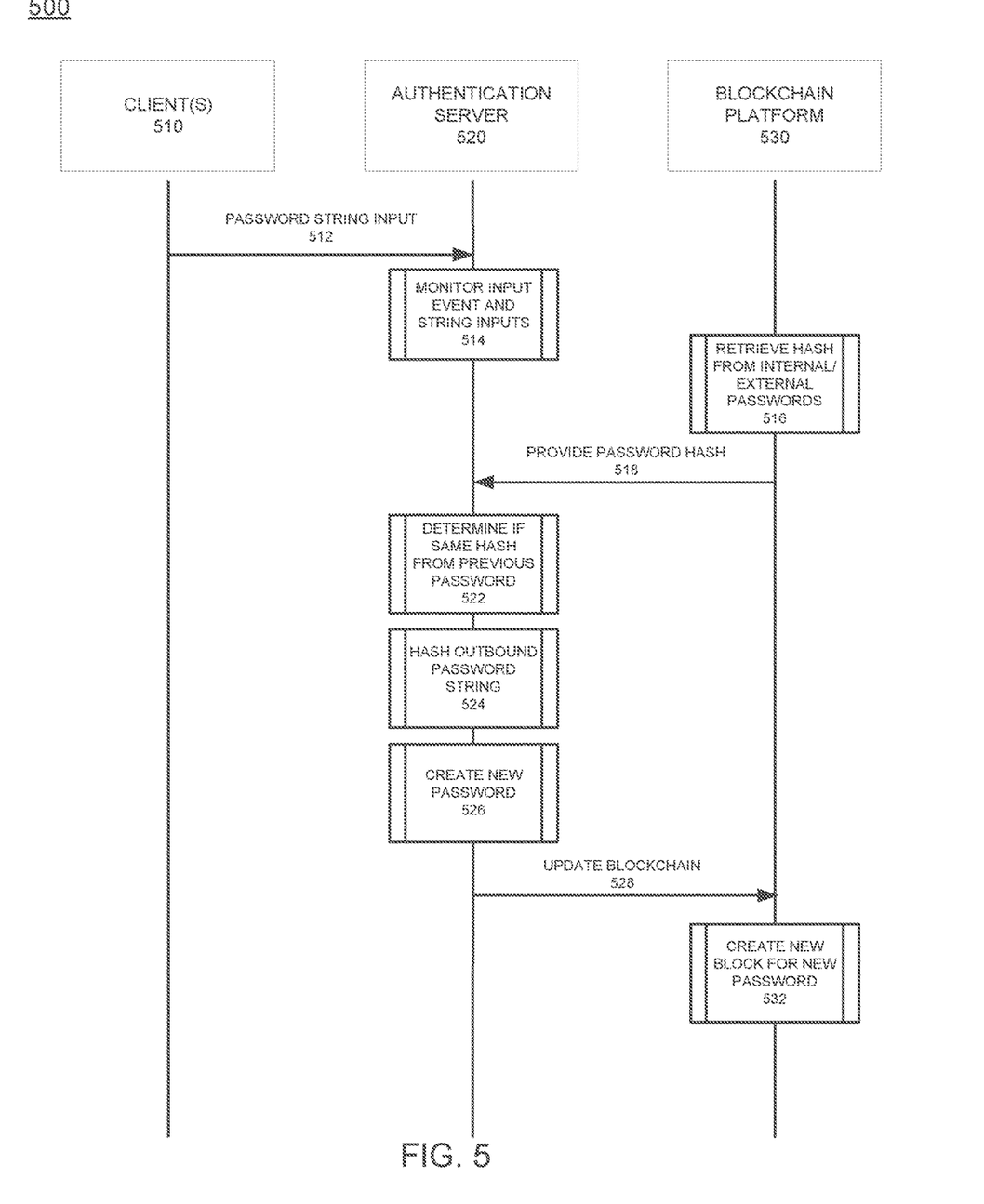
FIG. 5 illustrates a system messaging configuration configured to perform a password management function, according to example embodiments.

FIG. 5 illustrates a system messaging configuration configured to perform a password management function, according to example embodiments. Referring to FIG. 5, the system 500 may include a number of components or modules which may include software, hardware or a combination of both. The components may include a first component, such as a client(s) 510, such as user devices, computers, phones, smartphones, etc., with corresponding accounts which may access a second component, such as an authentication server 520 or other computing device when attempting to access a network via credentials. The reference to password history and other password related data may be referenced from a third component, such as a blockchain platform 530. In operation, the user may input a string of text 512. A process of the server may monitor the input for password input strings 514. The blockchain platform 530 may be referenced to identify internal/external passwords 516. The hashes of those passwords may be retrieved 518 and compared to new passwords input by the user to determine if they are the same 522. A new password input may be hashed 524 to create a new password 526. The updates 528 are made for any new passwords 532 associated with a user profile and any other password related action.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 510, 520 and 530 may be directly connected or communicably coupled to one another, in a wired or wireless manner, and may reside locally and/or remotely.

Figure 6A:
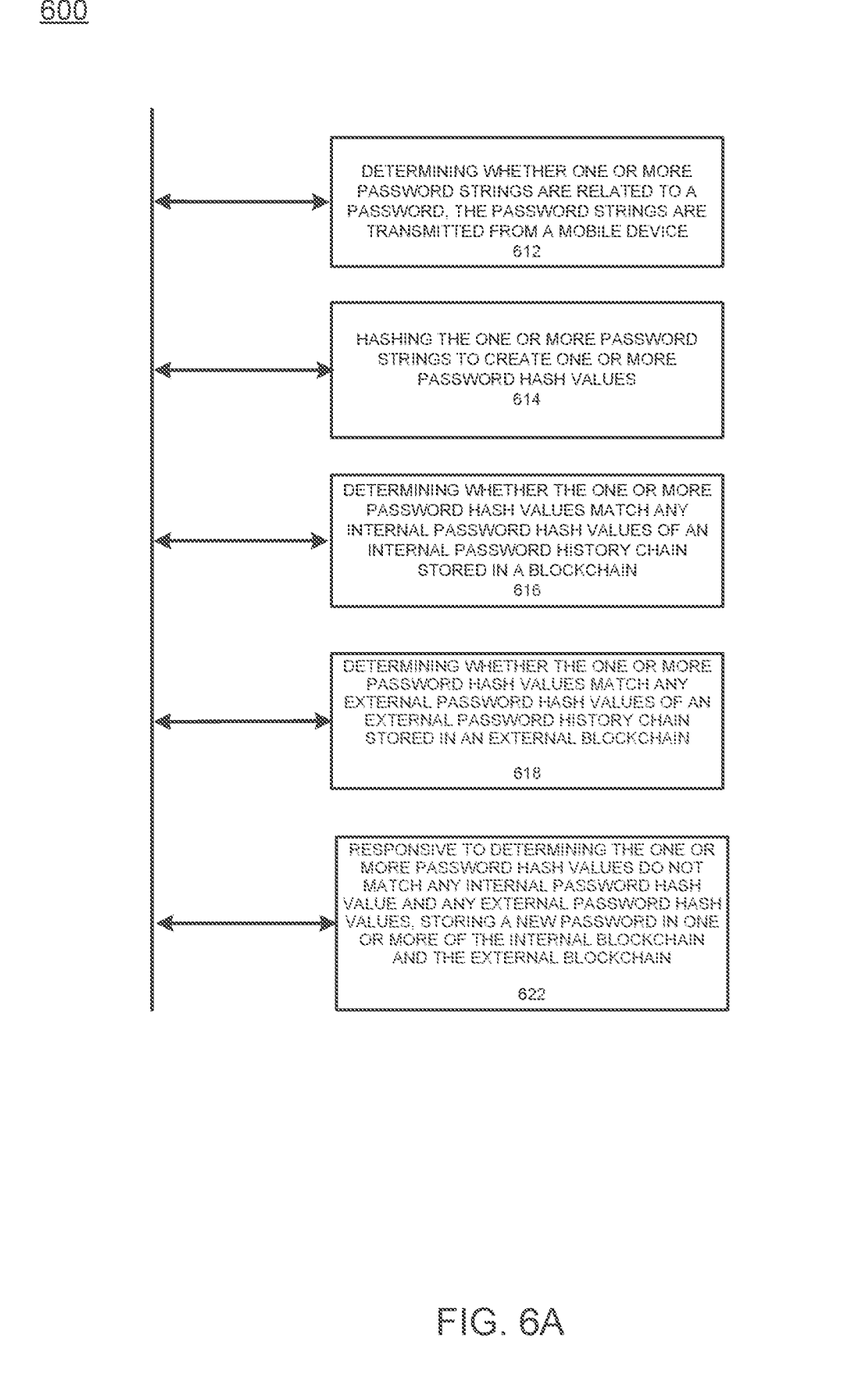
FIG. 6A illustrates a flow diagram of an example method of managing passwords with a blockchain, according to example embodiments.

FIG. 6A illustrates a flow diagram 600 of an example method of managing passwords with a blockchain, according to example embodiments. Referring to FIG. 6A, the method may include determining whether one or more password strings are related to a password, and the password strings are transmitted from a user device 612, hashing the one or more password strings to create one or more password hash values 614, determining whether the one or more password hash values match any internal password hash values of an internal password history chain stored in a blockchain 616 determining whether the one or more password hash values match any external password hash values of an external password history chain stored in an external blockchain 618, and responsive to determining the one or more password hash values do not match any internal password hash value and any external password hash values, storing a new password in one or more of the internal blockchain and the external blockchain 622. The one or more password hash values are created using a hash value function that was used to create the password.

The example method also includes identifying an account associated with one or more password strings, and retrieving the internal password hash values from the password history chain of the blockchain based on the account. The method further provides identifying all managed passwords stored in the blockchain, transmitting a warning message to the user device, and monitoring for the password sent from the user device. The monitoring provides monitoring for a plurality of passwords associated with a plurality of accounts associated with the user device. The method also includes monitoring a password application programming interface (API) for one or more password values. The method further provides storing a new block including the one or more password hash values in the blockchain, the blockchain includes one or more of an internal password blockchain and an external password blockchain.

Figure 6B:
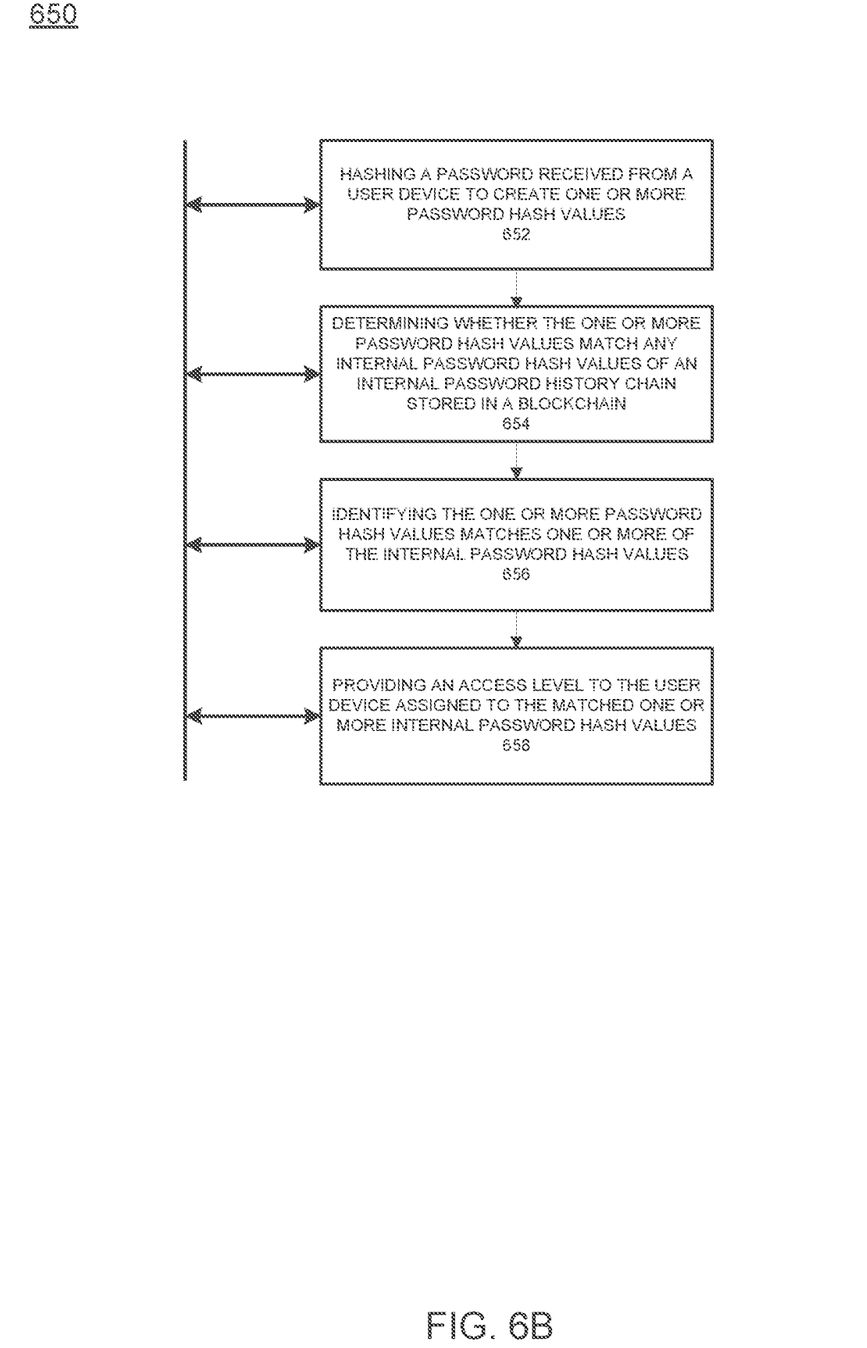
FIG. 6B illustrates another flow diagram of an example method of managing passwords with a blockchain, according to example embodiments.

FIG. 6B illustrates another flow diagram of an example method 650 of managing passwords with a blockchain, according to example embodiments. The method may include hashing a password received from a user device to create one or more password hash values 652, determining whether the one or more password hash values match any internal password hash values of an internal password history chain stored in a blockchain 654, identifying the one or more password hash values matches one or more of the internal password hash values 656, and providing an access level to the user device assigned to the matched one or more internal password hash values 658. When monitoring input from user devices for password related springs, the access levels are numerous and may include ready only, limited access, partial access, such as read and write, and full access which may include any type of document or server access and rights. In operation, the input password hash being compared and matched to the stored one or more internal password hashes causes a trigger event which grants the user device access based on the matched hash of the internal password, which in turn, has an assigned access level. The trigger event causes the access level associated with that matched internal hash value to be assigned to the user device.

Example embodiments may be a system, a method, and/or a computer program product at any possible technical detail level of integration. The computer program product may include a non-transitory computer readable storage medium (or media) having computer readable program instructions thereon for causing a processor to carry out aspects of the embodiments.

The non-transitory computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent or be integrated in any of the above-described components, etc.

Figure 7:
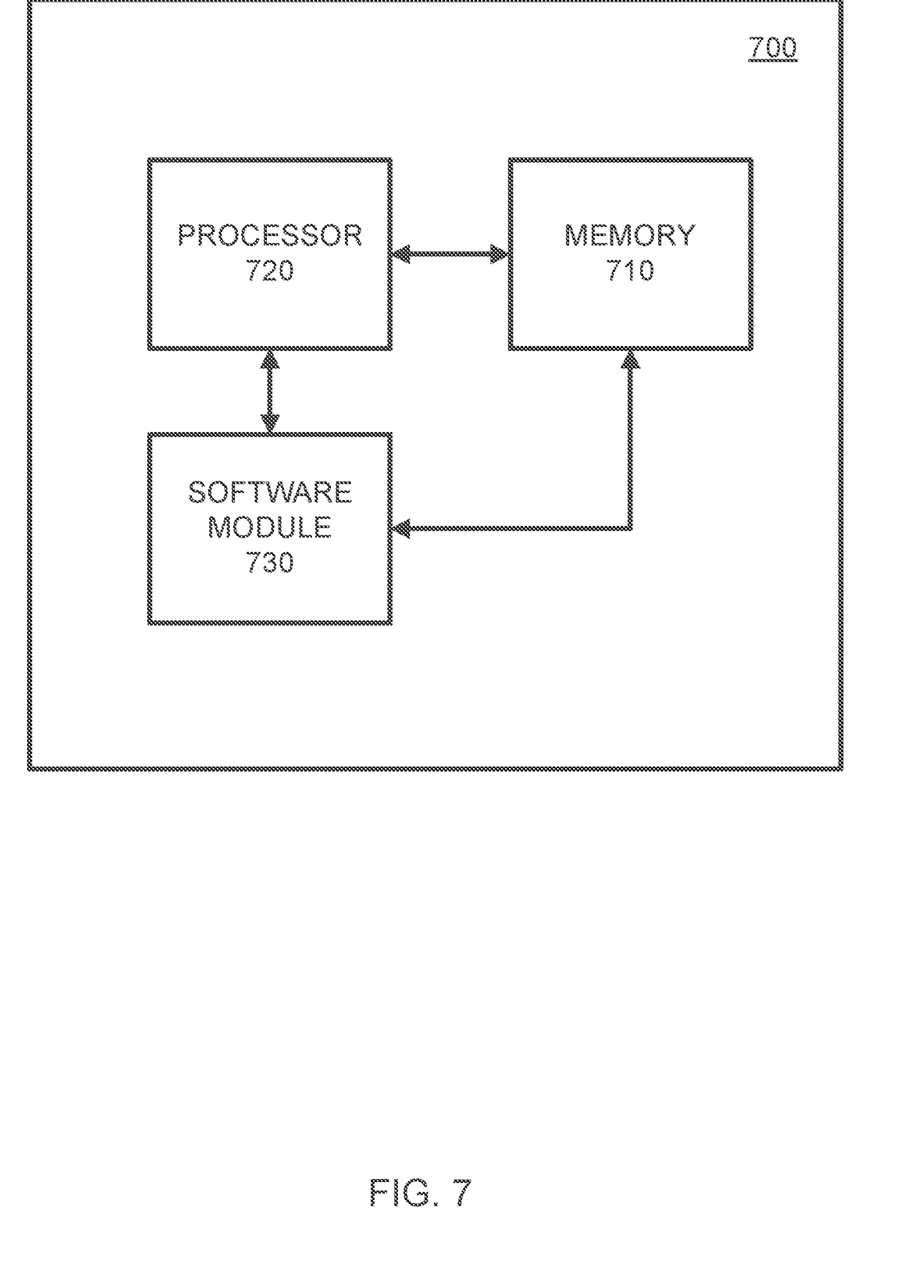
FIG. 7 illustrates an example network entity configured to support one or more of the example embodiments.

As illustrated in FIG. 7, a memory 710 and a processor 720 may be discrete components of a network entity 700 that are used to execute an application or set of operations as described herein. The application may be coded in software in a computer language understood by the processor 720, and stored in a computer readable medium, such as, a memory 710. The computer readable medium may be a non-transitory computer readable medium that includes tangible hardware components, such as memory, that can store software. Furthermore, a software module 730 may be another discrete entity that is part of the network entity 700, and which contains software instructions that may be executed by the processor 720 to effectuate one or more of the functions described herein. In addition to the above noted components of the network entity 700, the network entity 700 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
hashing a password received from a user device to create one or more password hash values;
determining that the one or more password hash values match one or more internal password hash values of an internal password history chain stored in a blockchain, wherein a block of the block chain stores all password hash values for all user devices that utilize the blockchain; and
providing an access level to the user device assigned to the matched one or more internal password hash values.

2. The method of claim 1, wherein the one or more password hash values are created using a hash value function that was used to create the password.

3. The method of claim 1, further comprising:
identifying an account associated with one or more password strings; and
retrieving the internal password hash values from the password history chain of an internal blockchain based on the account.

4. The method of claim 3, further comprising:
transmitting a warning message to the user device when the one or more password hash values match a previously stored password hash value stored in one or more of the internal blockchain and an external blockchain.

5. The method of claim 1, further comprising:
monitoring for the password sent from the user device, wherein the monitoring comprises monitoring for a plurality of passwords associated with a plurality of accounts associated with the user device.

6. The method of claim 1, further comprising:
monitoring a password application programming interface (API) for one or more password values.

7. The method of claim 3, further comprising:
storing a new block comprising the one or more password hash values in the internal blockchain.

8. An apparatus, comprising:
a hardware-implemented processor configured to:
hash a password received from a user device to create one or more password hash values;
determine whether the one or more password hash values match one or more internal password hash values of an internal password history chain stored in a blockchain, wherein a block of the block chain stores all password hash values for all user devices that utilize the blockchain; and
provide an access level to the user device assigned to the matched one or more internal password hash values.

9. The apparatus of claim 8, wherein the one or more password hash values are created using a hash value function that was used to create the password.

10. The apparatus of claim 8, wherein the hardware-implemented processor is further configured to:
identify an account associated with one or more password strings; and
retrieve the internal password hash values from the password history chain of an internal blockchain based on the account.

11. The apparatus of claim 10, wherein the hardware-implemented processor is further configured to:
control a transmitter to transmit a warning message to the user device when the one or more password hash values match a previously stored password hash value stored in one or more of the internal blockchain and an external blockchain.

12. The apparatus of claim 8, wherein the hardware-implemented processor is further configured to:
monitor for the password sent from the user device, and monitor for a plurality of passwords associated with a plurality of accounts associated with the user device.

13. The apparatus of claim 8, wherein the hardware-implemented processor is further configured to:
monitor a password application programming interface (API) for one or more password values.

14. The apparatus of claim 10, wherein the hardware-implemented processor is further configured to:
store a new block comprising the one or more password hash values in the internal blockchain.

15. A non-transitory computer readable storage medium configured to store one or more instructions that when executed by a processor cause the processor to perform:
hashing a password received from a user device to create one or more password hash values;
determining whether the one or more password hash values match one or more internal password hash values of an internal password history chain stored in a blockchain, wherein a block of the block chain stores all password hash values for all user devices that utilize the blockchain; and
providing an access level to the user device assigned to the matched one or more internal password hash values.

16. The non-transitory computer readable storage medium of claim 15, wherein the one or more password hash values are created using a hash value function that was used to create the password.

17. The non-transitory computer readable storage medium of claim 15, configured to store one or more instructions that when executed by the processor cause the processor to perform:
identifying an account associated with one or more password strings; and
retrieving the internal password hash values from the password history chain of an internal blockchain based on the account.

18. The non-transitory computer readable storage medium of claim 17, configured to store one or more instructions that when executed by the processor cause the processor to perform:
transmitting a warning message to the user device when the one or more password hash values match a previously stored password hash value stored in one or more of the internal blockchain and an external blockchain.

19. The non-transitory computer readable storage medium of claim 15, configured to store one or more instructions that when executed by the processor cause the processor is to perform:
monitoring for the password sent from the user device, wherein the monitoring comprises monitoring for a plurality of passwords associated with a plurality of accounts associated with the user device.

20. The non-transitory computer readable storage medium of claim 17, configured to store one or more instructions that when executed by the processor cause the processor to perform:
monitoring a password application programming interface (API) for one or more password values; and storing a new block comprising the one or more password hash values in the internal blockchain.

* * * * *